United States Patent
Young et al.

(10) Patent No.: US 8,466,257 B2
(45) Date of Patent: Jun. 18, 2013

(54) PROCESS AND APPARATUS FOR PURIFYING SOLID SALT COMPOSITIONS

(75) Inventors: Thomas C. Young, Lake Jackson, TX (US); Ha Q. Pham, Lake Jackson, TX (US); Shuji Maeda, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 242 days.

(21) Appl. No.: 12/918,262

(22) PCT Filed: Feb. 9, 2009

(86) PCT No.: PCT/US2009/033564
§ 371 (c)(1),
(2), (4) Date: Aug. 18, 2010

(87) PCT Pub. No.: WO2009/105359
PCT Pub. Date: Aug. 27, 2009

(65) Prior Publication Data
US 2010/0331494 A1    Dec. 30, 2010

Related U.S. Application Data

(60) Provisional application No. 61/030,816, filed on Feb. 22, 2008.

(51) Int. Cl.
*C08F 6/16* (2006.01)
(52) U.S. Cl.
USPC ........ 528/502 A; 528/480; 528/491; 528/499; 528/502 R; 528/502 D; 521/40; 525/403; 422/255; 422/261; 422/267; 210/348; 210/691; 210/692; 210/694

(58) Field of Classification Search
USPC ................. 528/480, 482, 491, 493–498, 499, 528/502 R, 502 A, 502 D, 503; 521/40; 525/50, 525/403; 422/255, 261, 267; 210/348, 691, 210/692, 694; 252/182.32, 183.13
See application file for complete search history.

(56) References Cited

U.S. PATENT DOCUMENTS

| | | | |
|---|---|---|---|
| 4,126,526 A | 11/1978 | Kwon et al. | |
| 4,578,195 A * | 3/1986 | Moore et al. | 210/679 |
| 4,751,280 A | 6/1988 | Pham et al. | |
| 4,976,864 A | 12/1990 | Baradel et al. | |
| 6,214,235 B1 * | 4/2001 | Silva | 210/692 |
| 2004/0209781 A1 * | 10/2004 | Harris | 507/200 |

FOREIGN PATENT DOCUMENTS

| | | |
|---|---|---|
| CN | 1124231 A | 6/1996 |
| CN | 1263051 A | 8/2000 |
| CN | 1792832 A | 6/2006 |
| CN | 1850635 A | 10/2006 |
| CN | 1884079 A | 12/2006 |
| DE | 155780 A3 | 7/1982 |

(Continued)

OTHER PUBLICATIONS

Office translation of WO 2007/122781 (Kikuchi et al).*

(Continued)

*Primary Examiner* — Frances Tischler

(57) ABSTRACT

Methods and apparatus for the recovery and purification of solid salt compositions from an organic liquid containing epoxy resin and at least one of epihalohydrin and solvent to obtain purified salt and/or brine compositions that may be useful in industrial processes.

5 Claims, 1 Drawing Sheet

FOREIGN PATENT DOCUMENTS

| | | |
|---|---|---|
| DE | 216471 A1 | 12/1984 |
| DE | 243503 A1 | 3/1987 |
| EP | 0340716 A2 | 11/1989 |
| EP | 0356854 A2 | 3/1990 |
| EP | 362934 A1 | 4/1990 |
| EP | 0484729 A1 | 5/1992 |
| GB | 2320020 A | 6/1998 |
| JP | 60081176 A | 5/1985 |
| JP | 03094884 A | 4/1991 |
| JP | 04060994 B | 9/1992 |
| JP | 3409915 B2 | 5/2003 |
| PL | 151776 A2 | 7/1988 |
| WO | WO-99/51523 A1 | 10/1999 |
| WO | WO-2007/122781 A1 | 11/2007 |

OTHER PUBLICATIONS

Semendyaeva N D et al: "Purification of wastewaters from epichlorohydrin production" Khimicheskaya Promyshlennost, Seriya: Khlornaya Promyshlennost, vol. 5, 1981, XP002465275.

* cited by examiner

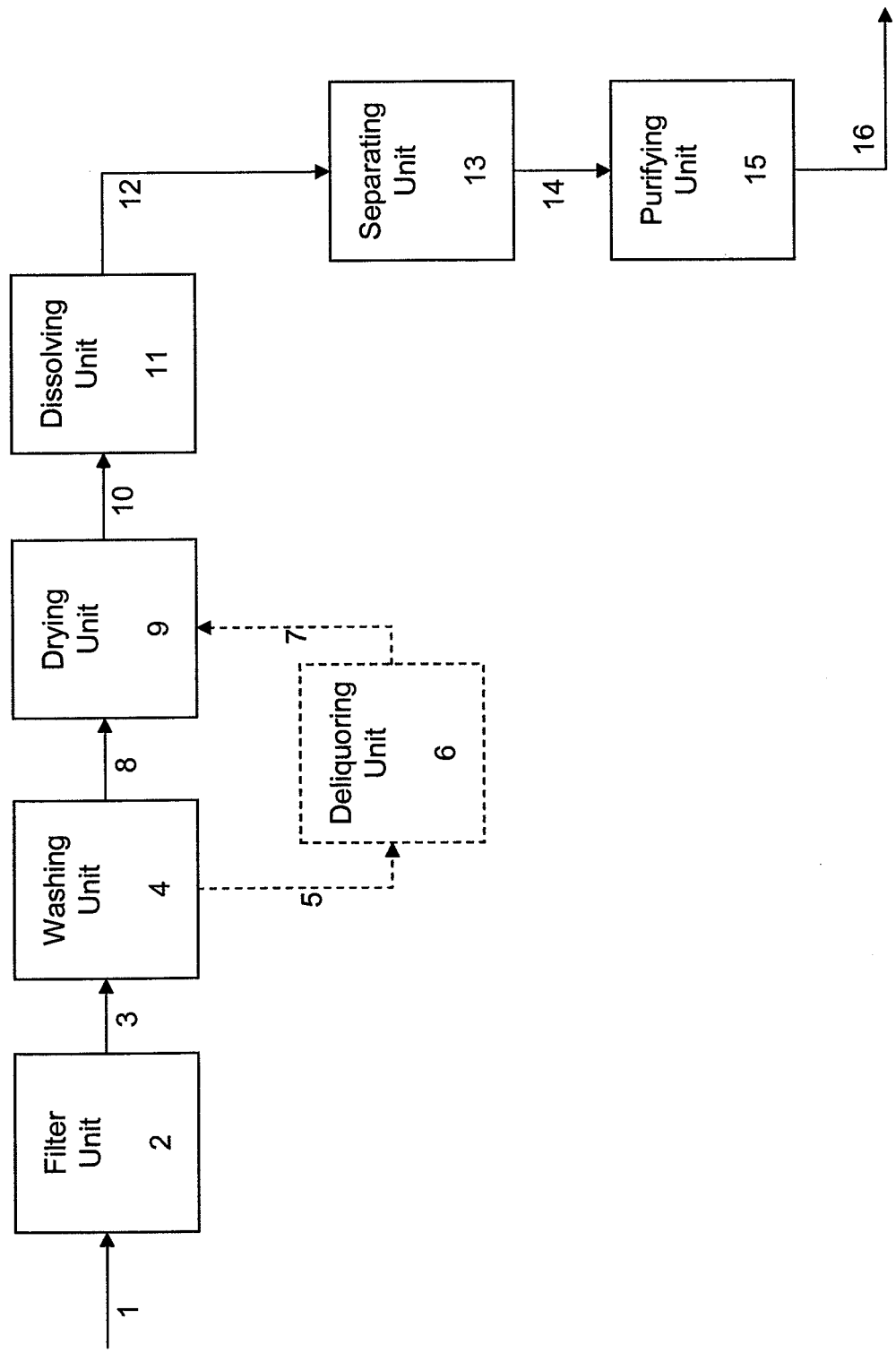

PROCESS AND APPARATUS FOR PURIFYING SOLID SALT COMPOSITIONS

BACKGROUND OF THE DISCLOSURE

1. Field of the Disclosure

Embodiments disclosed herein relate to purified brine, such as brine having reduced organic content, for example a reduced content of epoxy resin, epihalohydrin, reaction products, catalysts and/or solvents. Embodiments disclosed herein also relate to processes and apparatus for obtaining brine having reduced organic content. Other embodiments disclosed herein relate to improvement of processes and apparatus wherein brine is used in the processes or apparatus so as to include brine therein having reduced organic content and/or relates to brine obtained therefrom. Embodiments disclosed herein are useful in various processes and technologies, such as processes involving water, waste water, and brine purification, such as in chlorine/alkali processes and processes involving production of epoxy resins. Thus, embodiments disclosed herein also relate to processes and apparatus for purification of brine generated by industrial processes, such as the production of epoxy resins. Purified brine may be used in industrial processes such as the chlor-alkali process for the electrolytic conversion of brine to chlorine gas and sodium hydroxide or hypochlorite.

2. Background

In chemical processes, there is a need to obtain a maximum utility of incoming process streams, as well as the ability to recycle process streams, or to use byproducts from one process in other processes, particularly in nearby processes. Such uses of process streams are environmentally and economically desirable.

In the production of epoxy resins by the reaction of polyhydric phenols with epihalohydrins and alkali metal hydroxides, an alkali metal halide salt is produced as a byproduct. The salt can be either in aqueous solution, if the production process involves the contact of multiple liquid phases, or as a solid salt if azeotropic water removal is used during the reaction step.

The byproduct salt or brine is typically contaminated with organic compounds, such as the product epoxy resin, the epihalohydrin, reaction products from the hydrolysis of the epihalohydrin, the phase transfer catalyst or cosolvent from the reactor, or another solvent. It is desirable to purify the byproduct salt or brine before disposal or reuse.

JP04060994(B) and JP60081176(A) are directed to separation of an inorganic salt formed as a byproduct, by adding a concentrated aqueous solution of the inorganic salt formed as a byproduct to an epoxy resin reaction product, separating the resultant mixture into three layers of a resin solution layer, an aqueous layer of the inorganic salt and a slurry layer of the inorganic salt, and filtering off the inorganic salt from the slurry layer. As indicated in the English abstract of these Japanese documents, a compound having a hydroxyl or amino group is reacted with an epichlorohydrin and an aqueous solution of an alkali while removing water by the azeotropic distillation to produce an epoxy resin. In the process, in order to remove an inorganic salt formed as a byproduct, a concentrated aqueous solution of the above-mentioned inorganic salt is added to the above-mentioned reaction product directly or after distilling away the excess epichlorohydrin and diluting with an organic solvent, and the resultant mixture is agitated, allowed to stand and separated into three layers of a resin solution layer, an aqueous layer of the inorganic salt and a slurry layer of the inorganic salt. The inorganic salt is then filtered off from the slurry layer of the inorganic salt, and the inorganic salt, which is a byproduct, is efficiently separated from the above-mentioned reaction product as crystals in high purity.

U.S. Pat. No. 4,751,280 discloses a method of producing epoxy resin by reaction with azeotropic water removal followed by drying, filtering and washing steps. As disclosed therein, salt removal can be accomplished by "any suitable mechanical means" such as filtration or centrifugation, and a vertical basket centrifuge is cited as a particularly suitable device.

EP0356854 B1 discloses a method of treating organic-contaminated salts by washing with a solvent, deliquoring the salt cake, and drying the salt to give a salt containing small amounts of residual organic contamination. The example describes washing a contaminated salt from epoxy resin production in a basket centrifuge with epichlorohydrin and an epichlorohydrin/1-methoxy-2-propanol mixture, followed by deliquoring in the basket centrifuge. The salt was then dried in a rotary dryer.

DD216471 A1 discloses mixing the reaction products from epoxy resin manufacture (epoxy resin, inorganic salts and solid organic byproducts) with an organic solvent for >15 minutes, followed by addition of water, followed by decanting of the aqueous phase to give improved phase separation.

DD155780 A3 discloses the use of centrifugation to separate an epoxy resin/solvent layer from an aqueous salt layer.

CS190218 B1 discloses the separation, which includes separation by gravity or centrifuge, of epoxy resins from reaction mixtures into a salt layer and a resinous layer containing epichlorohydrin and epoxy resin.

CS176770 B1, CS174508 B1 and CS136171 disclose the use of a centrifuge for separation of the organic and aqueous phases in an example of the preparation of an epoxy resin.

SU245368 discloses the use of filtration to remove salt formed in the preparation of epoxy novolak resins.

SU191118 describes the continuous removal of a saturated aqueous salt layer from a resin solution during epoxy resin production, followed by azeotropic distillation of the water and subsequent removal of the salt by filtration.

CN1850635 A discloses a method of treating waste brine from an epoxy resin process by neutralization, filtration, film distillation, crystallization, and solid-liquid separation. Also disclosed is the use of biological treatment for wastewater with low salt content.

CN1884079 A discloses a method of purifying contaminated solid salts from epoxy resin production by reacting with HCl, neutralizing, removing floating impurities, and multiple crystallization and solid/liquid separation steps.

CN1792832 A discloses a method of extracting waste brine from an epoxy resin process with a solvent, neutralizing with an acid to pH 5-9, adding a coagulant and/or a flocculant, filtering, concentrating by evaporation, then crystallizing the salt from the wastewater to obtain a solid salt product.

CN1124231 B and CN1263051 A disclose a method of treating wastewater from an epoxy resin process by decanting the organic phase, concentrating, and crystallizing to obtain a solid salt. A portion of the mother liquor from the crystallization step is discharged, and a portion may be recycled. The condensate from the evaporative crystallization may be used for wash water.

GB2320020 A discloses a method for removing halogenated organic compounds from wastewater using powdered lignite or activated carbon. The method is described as applicable to wastewater from a variety of chemical production processes, including epoxy resin production.

JP3409915 B2 discloses the use of centrifugal separation tanks with rotational disks to improve the phase separation of epoxy resins from wastewaters.

JP03094884 A discloses the use of activated carbon to adsorb impurities including polymer from epoxy resin wastewater. COD is said to be reduced from 10,000 mg/L to 1200 mg/L using a batch treatment.

PL151776 B2 discloses a method of treating epoxy resin wastewater by use of multiple evaporative crystallization/filtration steps. pH adjustment and salt washing are also done. An organic phase containing glycerol and polyglycerols is recovered.

U.S. Pat. No. 4,976,864 A and EP362934 B1 disclose a method for treating epoxy resin wastewater by hydrolysis under alkaline conditions followed by removal of 90% of NaCl by evaporative crystallization or electrodialysis. The use of a combination of anaerobic and aerobic digestion is also described.

DD243503 A1 discloses the use of heating and decanting to remove insoluble epoxy resin from a wastewater containing NaCl and solids.

SUMMARY OF THE DISCLOSURE

Embodiments disclosed herein are directed to processes for recovery and/or purification of solid salt compositions, such as salt byproducts from epoxy resin production, and particularly to purification of solid salts compositions for obtaining purified, clean brine, with the clean brine being suitable for reuse, such as recycling, or discharge.

Embodiments disclosed herein provide methods for purifying a solid salt composition including: separating the solid salt from an organic phase containing epoxy resin and at least one of epihalohydrin and solvent to obtain a separated solid salt; washing the separated solid salt with at least one solvent to reduce an amount of epoxy resin retained in the solid salt; drying the washed salt at a temperature to reduce an amount of volatile components in the solid salt to obtain a solid salt having a reduced content of volatile components; dissolving the solid salt having a reduced content of volatile components in water forming a brine; and removing at least one of insoluble material and soluble organic contaminants from the brine to form a purified brine. For example, the removing may include subjecting the brine to a separating technique to remove insoluble material and/or purifying the brine to remove soluble organic contaminants.

Other embodiments disclosed herein provide methods for purifying a solid salt composition including: separating the solid salt from an organic phase containing epoxy resin and at least one of epihalohydrin and solvent to obtain a separated solid salt; washing the separated solid salt with at least one solvent to reduce an amount of epoxy resin retained in the solid salt; dissolving the solid salt having reduced epoxy resin content in water forming a brine; stripping, distilling or otherwise treating the brine to reduce an amount of volatile components in the brine to obtain a brine having a reduced content of volatile components; subjecting the brine having a reduced content of volatile components to a separating technique to remove insoluble material; and purifying the brine to remove soluble organic contaminants.

Embodiments disclosed herein also provide methods for production of epoxy resins, including: reacting polyhydric phenol and epihalohydrin and alkali metal hydroxide producing epoxy resin and an alkali metal halide solid salt composition; purifying the solid salt composition including: separating the solid salt from an organic phase containing epoxy resin and at least one of epihalohydrin and solvent to obtain a separated solid salt; washing the separated solid salt with at least one solvent to reduce an amount of epoxy resin retained in the solid salt; drying the washed salt at a temperature to reduce an amount of volatile components in the solid salt to obtain a solid salt having a reduced content of volatile components; dissolving the solid salt having a reduced content of volatile components in water forming brine; and subjecting the brine to a separating technique to remove insoluble material; and at least one of recycling the brine, storing the brine, disposing of the brine, and forwarding the brine to a different process.

Embodiments disclosed herein also provide apparatus for purifying a solid salt composition, the apparatus including: a filter unit to separate the solid salt from an organic phase containing epoxy resin and at least one of epihalohydrin and solvent to obtain a separated solid salt; a washing unit to wash the separated solid salt with at least one solvent to reduce an amount of epoxy resin retained in the solid salt; a drying unit to dry the washed salt at a temperature to reduce an amount of volatile components in the solid salt to obtain a solid salt having a reduced content of volatile components; a dissolving unit to dissolve the solid salt having a reduced content of volatile components in water forming brine; a separating unit to separate insoluble material from the brine; and a purification unit to separate soluble organic material from the brine.

Separating the solid salt from an organic salt may include subjecting the solid salt composition to physical separation. Separating the solid salt from an organic salt may also include subjecting the solid salt composition to filtration or centrifugation. The filtration may be performed using at least one of a pressure filter, a vacuum filter and a belt filter. The centrifugation may be performed using at least one of decanting-type centrifuges and filtering-type centrifuges.

Separating the solid salt from an organic salt may include reducing liquid content of the solid salt so that the solid salt contains less than 50% liquid by weight, less than less than 30% liquid by weight, or less than 20% liquid by weight.

The at least one solvent may include at least one solvent capable of reducing an amount of epoxy resin retained in the solid salt while not dissolving the solid salt. In some embodiments, the at least one solvent does not contain low-volatility components that are difficult to evaporate. In a family of embodiments, the at least one solvent may include epichlorohydrin.

The drying may be performed at a temperature of up to about 300° C. in som embodiments; up to about 200° C. in other embodiments, up to about 150° C. in other embodiments; and at a temperature of at least about 60° C., or at a temperature of at least about 100° C., in various embodiments. In a family of embodiments, the drying can be performed in the presence of an inert gas.

Subsequent to washing and prior to drying, the washed solid salt may be subjected to treatment to reduce an amount of liquid in the solid salt. In various embodiments, the brine can have a salt concentration between 5 and 25 wt %, or a salt concentration between 15 and 25 wt %.

BRIEF DESCRIPTION OF THE DRAWINGS

Embodiments of the present disclosure are further described in the Detailed Description which follows, in reference to the figures of drawings by way of non-limiting example of exemplary, wherein:

The sole FIGURE illustrates exemplary apparatus including optional units for obtaining purified brine according to embodiments disclosed herein.

DETAILED DESCRIPTION

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless as indicated to the contrary, the numerical parameters set forth in the following specification and attached claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

Embodiments disclosed herein may be used for purification of solid salt compositions, particularly azeotropic solid salt compositions. Embodiments disclosed herein also relate to the formation of purified brine, and to the use of the purified brine, such as use for recycling in a process and/or use in a separate process, and well as for disposal of the brine.

The solid salt compositions may include alkali metal halide solid salt compositions or alkaline earth metal halide solid salt compositions, such as, but not limited to sodium chloride, potassium chloride, and calcium chloride solid salt compositions.

The solid salt compositions that purified according to embodiments disclosed herein may come from various processes, and the purified brine can be utilized in various processes. For example, the compositions being purified can include compositions, including byproducts, from, without limitation, reaction of bisphenol-A with epichlorohydrin and sodium hydroxide to make an epoxy resin; production of liquid epoxy novolacs by reaction of bisphenol-F novolacs with epihalohydrins and alkali metal hydroxides; reaction of other phenolic compounds with epihalohydrins to produce epoxy resin; and reaction of other —OH containing chemicals with epihalohydrins to produce an epoxy resin, including mono- or multi-functional alcohols, carboxylic acids, etc. The epihalohydrins can be, for example, epichlorohydrin and/or epibromohydrin.

Embodiments disclosed herein are directed to processes for recovery of salt byproduct from epoxy resin production and the purification for the obtaining of clean brine, with the clean brine being suitable for reuse, such as recycling, or discharge. For example, embodiments disclosed herein may be especially useful in the purification of brine associated with processes and systems involving the production of epoxy resins by reaction of bisphenol-A with epihalohydrin and alkali metal hydroxides, wherein the reactor uses azeotropic drying to form a solid salt.

For example, embodiments disclosed herein may be useful in processes, such as disclosed in U.S. Pat. No. 4,751,280, which is incorporated by reference herein in its entirety, pertaining to the preparation of glycidyl derivatives of aromatic compounds containing an active hydrogen atom reactive with an epihalohydrin. Such processes can include reacting a molar excess of at least one epihalohydrin with at least one aromatic compound containing an active hydrogen atom reactive with an epihalohydrin in the presence of an organic solvent or mixture of organic solvents, an alkali metal hydroxide and optionally in the presence of a catalyst for the reaction between the aromatic active hydrogen-containing compound and the epihalohydrin while controlling the concentration of water in the reaction mixture.

Thus, for example, in production technology of epoxy resins that involve the formation of solid salt, such as azeotropically-dried coupling/epoxidation or epoxidation, the effluent from the epoxy resin production reactor is a slurry including solid salt and an organic liquid mixture of epoxy resin, the epihalohydrin, and optionally one or more other solvents. The reactor effluent may be processed directly according to embodiments disclosed herein. Alternatively, the epihalohydrin and other volatile components may be evaporated from the epoxy resin and salt, followed by the addition of a second solvent or solvent mixture to give a slurry of the solid salt and an organic liquid mixture of epoxy resin and the second solvent or solvent mixture, which may then be processed according to methods disclosed herein.

In one embodiment, the solid salt can be separated from the organic liquid by filtration or centrifugation; the solid salt can be washed with epihalohydrin and/or solvent; the salt can be dried to remove volatile components; the solid salt can be dissolved in water to form a brine; the brine can be treated to remove solids, such as, without limitation, by filtration, dissolved air flotation or other methods; the brine can also be treated to remove soluble organic components, such as by carbon adsorption.

In another embodiment, the solid salt can be separated from the organic liquid by filtration or centrifugation; the solid salt can be washed with epihalohydrin and/or solvent; the solid salt can be dissolved in water to form a brine; the brine can be distilled to remove the volatile organic components; the brine can be treated to remove solids, such as, without limitation, by filtration, dissolved air flotation or other methods. The brine can also be treated to remove soluble organic components, such as by carbon adsorption.

According to embodiments disclosed herein, highly pure brine can be obtained that contains little organic contamination. For example, in various embodiments, the purified brine may contain less than 100 ppm Total Organic Carbon (TOC); less than 20 ppm TOC in other embodiments; less than 10 ppm TOC in other embodiments; and 5 ppm TOC or less in yet other embodiments. The purified brine may be suitable as a raw material for other manufacturing processes. The purified brine according to embodiments disclosed herein can therefore be used in a variety of processes, including, but not limited to, chlor/alkali production and soda ash production processes. The brine is also of sufficient purity to meet standards for discharge to an ocean or other saline waterway without additional treatment other than optional dilution.

The solid salt can be separated from the organic phase, such as the organic phase containing the epoxy resin and epihalohydrin and/or a solvent, by one or more physical solid separation techniques, including, but not limited to, decantation, gravity sedimentation, filtration, filtering-type centrifugation, or sedimenting-type centrifugation. The solid salt separation may be done in continuous or batch equipment.

Thus, the solid salt can be separated from the organic phase by filtration using various apparatus, including, but not limited to, pressure filters, vacuum filters, rotary filters, drum filters, disk filters or belt filters, or a filtering-type centrifuge including basket centrifuges, conical-screen centrifuges, pusher centrifuges and peeler centrifuges, or a sedimenting-type centrifuge including solid-bowl centrifuges and screen-bowl centrifuges.

The solid salt separation, in some embodiments, may be performed to obtain a cake from the solid separation step that is deliquored to an extent to contain less than 50% liquid by weight; less than 30% liquid by weight in other embodiments; and less than 20% liquid by weight in yet other embodiments.

Following, the solid separation step, the resulting material can be washed one or more times with at least one solvent to reduce an amount of epoxy resin retained in the salt cake. The at least one solvent can be, without limitation, any solvent that can reduce an amount of epoxy resin retained in the solid salt, e.g., the solid salt cake, while not dissolving the solid salt. In some embodiments, the at least one solvent is volatile enough to be easily removed by evaporation, and in which the epoxy resin, the epihalohydrin and/or the solvent retained on the salt cake are soluble. Besides the epihalohydrin, suitable solvents commonly include, for example, halogenated hydrocarbons, ketones, aliphatic alcohols, aromatic hydrocarbons, glycol ethers and combinations thereof. Particularly suitable solvents include, for example, epichlorohydrin, toluene, methylisobutyl ketone, methyl ethyl ketone, xylene, benzene, methanol, ethanol, isopropanol, propylene glycol methyl ether, and combinations thereof.

In some embodiments, the solvent used to wash the salt cake is also the same as one or more of the solvents contained in the liquid retained on the solid salt cake. Thus, a solid salt cake containing epoxy resin and epihalohydrin may be washed with the epihalohydrin, for example. As another example, a solid salt cake containing epoxy resin, epihalohydrin and a cosolvent may be washed with either epihalohydrin or the epihalohydrin/cosolvent mixture. A solid salt cake containing epoxy resin and a solvent, but little or no epihalohydrin, may similarly be washed with the same solvent.

Preferably, the solid salt cake is washed one or more times, and in some embodiments, twice. Preferably the epichlorohydrin or solvent used to wash the cake does not contain resin or other low-volatility components that are difficult to evaporate. The temperature at which the cake is washed is not critical. However, temperature of the wash step may be from about 5° C. to 100° C. in some embodiments and more from 20° C. to 80° C. in other embodiments.

After the solid salt cake is washed, the slurry containing the washed solid salt and the organic wash liquid is optionally subjected to a second salt/liquid separation step to reduce the amount of organic liquid retained on the salt cake. In this optional second salt/liquid separation step, the solid salt can be separated from the organic phase by filtration, including, but not limited to, decantation, gravity sedimentation, filtration, filtering-type centrifugation or sedimenting-type centrifugation. Thus, the solid salt can be separated from the organic phase by filtration using various apparatus, including, but not limited to, pressure filters, vacuum filters, rotary filters, drum filters, disk filters or belt filters, or a filtering-type centrifuge including basket centrifuges, conical-screen centrifuges, pusher centrifuges and peeler centrifuges, or a sedimenting-type centrifuge including solid-bowl centrifuges and screen-bowl centrifuges The solid salt separation may be performed to obtain a cake from the solid separation step that is deliquored to an extent to contain less than 50% liquid by weight in some embodiments; less than 30% liquid by weight in other embodiments; and less than 20% liquid by weight in yet other embodiments.

The first separation of the salt from the organic liquid, the washing step and the optional second separation of the salt from the organic wash liquid may be accomplished in separate equipment. In some embodiments, the first separation of the salt from the organic liquid, the washing step and the optional second separation of the salt from the organic wash liquid are each performed within a single piece of equipment designed to both separate the solid from the liquid and to wash the solid cake. Suitable equipment for the combined solid/liquid separation and washing include, but are not limited to, rotary filters, pressure filters, vacuum filters, belt filters, solid-bowl centrifuges, screen-bowl centrifuges, basket centrifuges, pusher centrifuges and peeler centrifuges.

In one embodiment, after washing the solid salt with at least one solvent, the salt is dried at an elevated temperature to remove volatile components. The volatile components that can be removed are, without limitation, for example, the epihalohydrin, the solvent or solvent combination and other high volatility byproducts of the epoxy resin production process. The cake is dried to contain less than 0.1 wt % epihalohydrin and/or solvent in some embodiments; less than 100 ppm epihalohydrin and/or solvent in other embodiments; and less than 20 ppm epihalohydrin and/or solvent in yet other embodiments.

In some embodiments, the solid salt cake is dried at temperatures of up to about 300° C. in some embodiments; up to about 200° C. in other embodiments, up to about 150° C. in other embodiments; and at a temperature of at least about 60° C., or at a temperature of at least about 100° C., in various embodiments. In other embodiments, the solid salt cake may be dried at temperatures between about 40° C. and 300° C.; between about 60° C. and 200° C. in other embodiments; and between about 100° C. and 150° C. in yet other embodiments. The cake may be dried at pressures between about 0.1 psia and 45 psia in some embodiments; between about 4 psia and 30 psia in other embodiments; and between 8 psia and 20 psia in yet other embodiments. The drying temperature should be above the boiling point of the epichlorohydrin or solvent at the pressure in the dryer. When a combination of solvents is utilized, the drying temperature should be higher than the boiling point of each of the solvents at the pressure in the dryer.

Drying of the salt may be accomplished by many methods well known to those skilled in the art of solid drying. Drying equipment includes, but is not limited to, both direct drying equipment, where the solid is dried by direct contact with hot gases, and indirect drying equipment, where the solid is dried by transfer of heat through a solid surface. Batch or continuous drying may be utilized. Examples of suitable direct drying equipment includes rotary dryers, spray dryers, flash dryers, conveyor dryers, tray dryers and fluid-bed dryers. Examples of suitable indirect drying equipment include rotary dryers, drum dryers, disc dryers, screw-flight dryers and paddle dryers.

For direct drying equipment, the hot gases used may be an inert gas, such as but not limited to nitrogen, to reduce the risk of fires or explosions. For indirect drying equipment, an inert gas, such as but not limited to nitrogen, can optionally be used when drying the solid salt to improve removal of epichlorohydrin and/or other solvents. Thus, an inert gas can be added to the dryer in which the drying is taking place.

The dried solid salt is dissolved in water to form a brine. Preferably, the salt is dissolved in water to result in a brine having a concentration of 5 to 25 wt % salt in some embodiments; a concentration of 15 to 25 wt % salt in other embodiments. In some embodiments, the salt may be NaCl.

In some embodiments, the water used to dissolve the salt does not include organic and inorganic contaminants. For example, water that is purified to remove contaminants, including organic and inorganic contaminants, may be used.

The brine can be treated by any technique to remove insoluble material. In some embodiments, the technique may include a physical separation, such as, but not limited to, filtration, dissolved air flotation, or other method of solids removal. Insoluble material may include a polymer byproduct formed in the epoxy resin production reactors and a small amount of product epoxy resin that is retained on the cake. For example, the brine can be treated to remove insoluble material by decantation, filtration, dissolved air flotation, or other method of solids removal technique.

A filter aid, such as, but not limited to, diatomaceous earth, perlite and/or calcined rice hull, may be used to improve the ability to remove the insoluble material by filtration.

After solids are removed from the brine, the brine is then purified to remove soluble organic components. The purification method can be adsorption, crystallization, UV oxidation, ozonation, peroxide oxidation, Fenton oxidation, chlorinolysis, wet air oxidation, biological treatment and/or other treatment method. Adsorptive purification may be accomplished using a variety of adsorbents, including activated carbon, polymeric adsorbents or other adsorption media. Biological treatment methods are well known to those skilled in the art, and include bioxidation, membrane bioreactors, aerobic and anaerobic treatment, and other methods. A combination of one or more purification methods may also be used.

In some embodiments, brine may be purified by carbon adsorption. The activated carbon for carbon adsorption can be prepared from coal, coconut shells or another carbon source. The carbon adsorption beds are sized to remove organic components with a changeout frequency preferably longer than one week, more preferably longer than two weeks. One or more carbon beds may be used in series or in parallel.

If an adsorptive purification is used, solids and other insoluble components can be removed from the brine, prior to the adsorption bed, to prevent plugging of the adsorption beds. For example, greater than 95 wt % of the solids and insoluble components, including the polymer and the epoxy resin are removed. In some embodiments, the removal rate is such that the adsorption beds do not have to be replaced more frequently than once every two weeks.

Another embodiment provides a method for purifying a solid salt composition including the steps of: separating the solid salt from an organic phase containing epoxy resin and at least one of epihalohydrin and solvent to obtain a separated solid salt; washing the separated solid salt with at least one solvent to reduce an amount of epoxy resin retained in the solid salt; dissolving the solid salt having a reduced epoxy resin content in water forming brine; stripping, distilling or otherwise treating the brine to reduce an amount of volatile components in the brine to obtain a brine having a reduced content of volatile components; subjecting the brine having a reduced content of volatile components to a separating technique to remove insoluble material; and purifying the brine to remove soluble organic contaminants.

In this embodiment, the salt cake is not dried to remove volatile organic components prior to dissolving in water to form a brine. The volatile organic components are removed from the brine by distillation or stripping. Suitable equipment for distilling or stripping volatile organic components from brine are well known to those skilled in the art of distillation, and include, but are not limited to distillation columns, strippers, and the like. In this embodiment, the solvents used for the washing step may also be volatile in brine, so that they are easily removed from brine by distillation or stripping. For example, solvents useful for this embodiment include epihalohydrin, methylisobutyl ketone, toluene, methyl ethyl ketone, xylene, benzene, methanol, ethanol, isopropanol, and combinations thereof.

The brine formed after the salt is dissolved may contain enough organic components to form a second liquid phase because the solubility of those liquids in the brine has been exceeded. This second liquid phase may optionally be removed from the brine prior to distillation of the brine to remove the remainder of the volatile organic components. The second liquid phase may be removed by decantation or other suitable means. Decantation may be accomplished using gravity decanters, centrifugal decanters, coalescence followed by gravity decanting, or other decanting devices.

Once the purified brine has been obtained by embodiments as described above, the brine can optionally be crystallized, dewatered and dried, spray dried, or dried by other any technique within reason to obtain a purified solid salt product.

Also, the brine that is treated to a desired degree of purification can be diluted to lower the salt concentration and discharged into an ocean or other saline waterway.

Embodiments disclosed herein may be used in various apparatus and the apparatus can be combined in various manners to obtain purification of the solid salt composition. For example, as illustrated in the FIGURE, the solid salt composition can be fed via line 1 to a filter unit 2 to separate the solid salt from an organic phase containing epoxy resin and at least one of epihalohydrin and solvent to obtain a separated solid salt. The separated solid salt can be fed via line 3 to washing unit 4 wherein the separated solid salt is washed with at least one solvent to reduce an amount of epoxy resin retained in the solid salt. The washed solid salt can be fed via line 5 to optional deliquoring unit 6 and thereafter fed via line 7 to drying unit 9 to deliquor the washed solid salt prior to drying, or can be fed directly to drying unit 9 via line 8 to dry the washed salt at a temperature to reduce an amount of volatile components in the solid salt to obtain a solid salt having a reduced content of volatile components. The dried solid salt from the drying unit 9 can be fed via line 10 to dissolving unit 11 to dissolve the solid salt comprising reduced volatile components in water forming brine. The brine can be fed via line 12 to separating unit 13 to separate insoluble material from the brine. The brine can be fed via line 14 to the purifying unit 15 to remove soluble organic material from the brine. The separated brine can thereafter be fed by line 16 for at least one of recycle, storage, disposal and use in another process.

EXAMPLES

The following examples are for illustrative purposes only and are not intended to limit the scope of the embodiments disclosed herein. Unless otherwise stated, the units are percent by weight.

Example 1

A reaction product from a liquid epoxy resin manufacturing reactor, including liquid epoxy resin, epichlorohydrin, 1-methoxy-2-propanol, solid NaCl salt and glycerol-type polymer, is fed to a peeler centrifuge. In the peeler centrifuge, the salt is deliquored and washed twice with epichlorohydrin to reduce the epoxy resin content, resulting in a salt cake containing about 15% epichlorohydrin. The wet salt cake is moved by screw conveyor to a rotary paddle dryer. The rotary paddle dryer is heated by steam to 150° C. to evaporate epichlorohydrin and other volatile components from the salt, and a small amount of nitrogen is introduced into the dryer to facilitate removal of the epichlorohydrin. The dried salt, containing less than 20 ppm epichlorohydrin, is dissolved in water in an agitated tank to result in a brine containing approximately 18% NaCl. The brine is subjected to two stages of dissolved air flotation to remove the polymer, epoxy resin and other solids. The brine is then passed through two carbon adsorption beds containing a coal-based activated carbon. The Total Organic Carbon (TOC) content of the brine is measured and found to contain <5 ppm TOC.

Example 2

A reaction product from a liquid epoxy resin manufacturing reactor, including liquid epoxy resin, epichlorohydrin, 1-methoxy-2-propanol, solid NaCl salt and glycerol-type polymer, is fed to a peeler centrifuge. In the peeler centrifuge, the salt is deliquored and washed twice with epichlorohydrin to reduce the epoxy resin content, resulting in a salt cake containing about 15% epichlorohydrin. The wet salt cake is moved by screw conveyor to a rotary paddle dryer. The rotary paddle dryer is heated by steam to 150° C. to evaporate epichlorohydrin and other volatile components from the salt, and a small amount of nitrogen is introduced into the dryer to facilitate removal of the epichlorohydrin. The dried salt, containing less than 20 ppm epichlorohydrin, is dissolved in water in an agitated tank to result in a brine containing approximately 18% NaCl. The brine is filtered using a semi-continuous filter to remove the polymer, epoxy resin and other solids. Polypropylene filter media and a diatomaceous earth filter aid are used in the filtration step. The brine is then passed through two carbon adsorption beds containing a coal-based activated carbon. The TOC content of the brine is measured and found to contain <5 ppm TOC.

As described above, embodiments disclosed herein provide processes and apparatus for recover of a salt byproduct from epoxy resin production and for purification of brine. Processes disclosed herein may provide for one or more of recovery of a high purity salt and a high purity brine. The salt and the brine thus recovered may be suitable for reuse. Alternatively, due to the recovery of a high purity brine, the brine may be suitable for discharge, such as to an ocean or other saline waterway without additional treatment.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A method for purifying a solid salt composition, the method comprising:
    separating the solid salt from an organic liquid containing epoxy resin and at least one of epihalohydrin and solvent to obtain a separated solid salt;
    washing the separated solid salt with at least one solvent to reduce an amount of epoxy resin retained in the solid salt;
    drying the washed salt at a temperature to reduce an amount of volatile components in the solid salt to obtain a solid salt having a reduced content of volatile components;
    dissolving the solid salt having a reduced content of volatile components in water forming brine; and
    removing insoluble material from the brine by filtration or dissolved air flotation and then removing soluble organic contaminants by carbon adsorption to form a purified brine wherein the insoluble material is a polymer byproduct or epoxy resin.

2. The method of claim 1, wherein a filter aid is used to improve removal of insoluble material by filtration.

3. The method of claim 2, wherein the filter aid is selected from diatomaceous earth, perlite and calcined rice hull.

4. The method of claim 1, wherein the purified brine has a Total Organic Content of 10 ppm or less.

5. A method for purifying a solid salt composition comprising:
    separating the solid salt from an organic liquid containing epoxy resin and at least one of epihalohydrin and solvent to obtain a separated solid salt;
    washing the separated solid salt with at least one solvent to reduce an amount of epoxy resin retained in the solid salt;
    dissolving the solid salt comprising reduced volatile components in water forming brine;
    distilling the brine to remove the volatile organic components; and
    removing at least one of insoluble material and then removing soluble organic contaminants from the brine to form a purified brine wherein the insoluble material is a polymer byproduct or epoxy resin.

* * * * *